United States Patent [19]

Hartenstein et al.

[11] 3,843,627

[45] Oct. 22, 1974

[54] PROCESS FOR THE ISOLATION OF CONVALLATOXIN ACETONIDE

[75] Inventors: Johannes Hermann Hartenstein, Wittental; Gerhard Satzinger, Denzlingen, both of Germany

[73] Assignee: Warner-Lambert Company, Morris Plains, N.J.

[22] Filed: June 26, 1972

[21] Appl. No.: 266,188

[52] U.S. Cl. .............................. 260/210.5, 424/182
[51] Int. Cl. ......................................... C07c 173/00
[58] Field of Search ................................. 260/210.5

[56] References Cited
UNITED STATES PATENTS

| | | | |
|---|---|---|---|
| 3,163,636 | 12/1964 | Wagner et al. | 260/210.5 |
| 3,464,972 | 9/1969 | Rocher | 260/210.5 |
| 3,502,770 | 3/1970 | Renz et al. | 260/210.5 |
| 3,510,472 | 5/1970 | Buchner | 260/210.5 |

*Primary Examiner*—Johnnie R. Brown
*Attorney, Agent, or Firm*—Albert H. Graddis; Frank S. Chow

[57] ABSTRACT

The present invention relates to a process for isolating convallatoxin acetonide from a crude extract of convallaria by forming its acetonide which permits its separation from other products in the extract.

5 Claims, No Drawings

PROCESS FOR THE ISOLATION OF CONVALLATOXIN ACETONIDE

The present invention relates to a process for the isolation of convallatoxin from convallaria drug, marked by the fact that the convallatoxin is first concentrated in a crude extract and then transformed into the acetonide which is separated from by-products by crystallization and/or chromatography and subsequently subjected to a mild, acid hydrolysis.

Convallatoxin is a cardiac glycoside with the chemical structure of a strophanthidine-$\alpha$-L-rhamnoside. It is mainly found in the flowers and leaves of the lily of the valley (convallaria) associated with numerous related cardiac glycosides. So far, already more than 20 cardenolide glycosides have been proved to be present in convallaria majalis (W. Kubelka, M. Wichtl, *Naturwiss*, 50, 498 (1963)). Since Karrer (*Helv. Chim. Acta* 12, 506 (1929)) described the isolation of crystalline convallatoxin from convallaria majalis for the first time, several papers concerning an improvement of the isolation process were published. All known processes have in common that the major part of the inert material (e.g., saponins, tannins) is first separated from aqueous or aqueous-alcoholic drug extracts (as a rule by precipitation with lead acetate), and the convallatoxin is then separated from the major part of the secondary glycosides and other non-cardiac substances (e.g., sugars) by selective extraction with chloroform-alcohol mixtures. Due to still present impurities, the isolation of pure convallatoxin by means of crystallization from the convallatoxin extract, concentrated in the above manner, is incomplete or impossible at all; a more intensive concentration by means of chromatography is, however, too laborious and time consuming due to the small differences in polarity of the secondary glycosides. The yields of crystalline convallatoxin obtained according to these procedures with respect to the dry weight of the drugs used, vary from 0.02 to 0.06 percent (cf. e.g., K. Mohr, T. Reichstein, *Pharm. Acta Helv.* 23, 369 (1948)). Higher yields (0.07-0.08 percent for herba convallariae, 0.14 percent for flores convallariae) are stated by Boltze and Laufke (*Arch. Pharm.* 290, 412 (1957)). In this connection, however, it must be taken into account that according to more recent analytical assays of convallaria drugs of different origin (W. Bleier, *Diss. Wien* 1969) the total content of glycoside as well as the proportional distribution of the individual cardenolide glycosides is subject to large variations. Thus values between 0.067 and 0.302 percent were obtained for the convallatoxin content of flowers, and values between 0.026 and 0.148 percent for the convallatoxin content of leaves. Therefore, the yields stated in the different processes cannot be compared easily. In the case of the drug samples investigated the procedure described by Boltze et al., failed because the crude glycoside extract prepared according to this process contained too much accompanying material which prevented the convallatoxin from crystallizing.

It has now been found, most surprisingly, that the convallatoxin can be prepared in good yield from the crude glycoside extract if one takes advantage of the great tendency to crystallize of the convallatoxin acetonide. The smooth formation of the convallatoxin acetonide from the crude glycoside extract could not be expected, because, on the contrary, an unfavorable interference of the accompanying material with the reaction was very likely.

In the process according to the invention the concentrated crude dry extract is suspended in acetone and treated with 2,2-dimethoxypropane (ratio acetone/dimethoxypropane 2-3:1) in the presence of catalytic amounts of p-toluene-sulfonic acid-monohydrate. The mixture is allowed to stand for 10 minutes at room temperature and then neutralized and partitioned between water and chloroform. The dried organic phases are concentrated by evaporation. By crystallization from methanol, to which small amounts of water are added, a first fraction of pure acetonide, m.p. 159°-160°C, is obtained, if necessary following seeding. To isolate the residual acetonide separation of the mother liquor residue into three fractions by pseudochromatography on neutral aluminum oxide is sufficient. These three fractions are: (a) the acetonide fraction, (b) a less polar fraction and (c) a more polar fraction, according to the Rf-values in the thin-layer-chromatogram (silica gel, mobile phase: chloroform-/methanol 90/10). A second crop of analytically pure convallatoxin-acetonide can be obtained by crystallizing the fraction containing acetonide from methanol/-water following evaporation under reduced pressure. A total yield of 0.09 to 0.11 percent of convallatoxin-acetonide, related to the dry weight of the drug used, can be obtained in the process according to the invention.

The crude glycoside extract used in the present process can be obtained according to the concentration processes described in literature, e.g., according to the process (cf. Example 1) stated by Boltze and Laufke (l.c.). If the crude extract, obtained in the way described, is processed according to the invention, then in contrast to literature (*Arch. Pharm.* 290, 412 (1957)) and unexpectedly it is possible to completely isolate convallatoxin acetonide from the crude extract. A special advantage of the process according to the present invention, however, must be seen in the fact that it makes it possible to avoid the precipitation of undesirable by-products with lead salts, a process usual in the isolation of cardiac glycosides which is very time consuming and involves considerable losses. Then, following acetonization of the glycoside extract, solely a rough pre-separation of the crude product on neutral aluminum oxide has to be effected in order to make the convallatoxin acetonide crystallize (cf. Example 2). In proceeding thus, the isolation process which so far has been very laborious is simplified considerably. From the convallatoxin-acetonide obtained by means of the process according to the invention crystalline convallatoxin can be prepared in a 85-90 percent yield by way of a mild, acid hydrolysis. In order to perform the reaction, the acetonide is dissolved in a watermiscible solvent as, e.g., ethanol, acetone, or dioxane and, following addition of aqueous mineral acid, preferably diluted sulphuric acid, subjected to hydrolysis at room temperature or at a slightly increased temperature, preferably at 50°-55°C. Profitably the acid concentration is between 0.1 and 1 percent. It is to be considered surprising that under the conditions of the process according to the invention no side-reactions, as elimination of the labile tertiary hydroxyl groups or glycoside cleavage takes place, which may cause an impairment to the yield.

Convallatoxin is used as a therapeutic for the treatment of cardiac insufficiency because its effect is similar to that of strophanthin. Aqueous, if necessary stabilized, solutions which are applied intravenously are the preferred route of administration. The daily dose is between 0.125 and 0.5 mg.

The convallatoxin-acetonide isolated directly by means of the process according to the invention can also be used for preparing orally active convallatoxin preparations.

The following examples serve to illustrate the process according to the invention, but they are not intended to limit it thereto.

EXAMPLE 1

Preparation of the Glycoside Crude Extract 500 g of flowers of the lily of the valley, contaminated by flowerstem impurities, which had been powdered in a mixer, are macreated while stirring, with 5 l of 50 percent aqueous methanol for 72 hours at room temperature. Subsequently, the mixture is filtered by suction and the residue is washed with 1 lt. of aqueous methanol. The dark-brown drug extract so obtained is concentrated to approx. 1 lt. on the rotary evaporator under reduced pressure, at a bath temperature of 35°–40°C, mixed with a solution of 40 g of lead acetate in 220 ml of water and then centrifuged. Lead is removed from the supernatant solution by adding a 10 percent aqueous sec. sodium phosphate solution and filtration. After adjusting the pH to 6.6 adding 20 percent aq. sodium carbonate solution, the mixture is concentrated to a volume of 800 ml by means of evaporation under reduced pressure. Subsequently, the concentrate is extracted with a chloroform/methanol mixture 93:7 (v/v) at 35°–40°C/140 torr for 25 hrs., the extracting solvent being exchanged every 8 hours. The combined organic phases are concentrated to approx. 5 ml by means of evaporation in vacuo and added to 100 ml of petroleum ether. Following standing 2 hrs. at 5°C, the supernatant solution, containing no Keddepositive material, is poured off. The convallatoxin contained in the remaining dark-brown slurry cannot be induced to crystallize from methanol/water according to Arch. Pharm. 290, 412 (1957).

Preparation of Convallatoxin-Acetonide from the Glycoside Crude Extract

The crude glycoside is evaporated to dryness in vacuo and the dark-brown foam is suspended in 50 ml of anhydrous acetone. 25 ml of 2,2-dimethoxypropane and 500 mg of p-toluene-sulfonic-acid-monohydrate are added. Following standing for 10 minutes at room temperature, the solution is neutralized with 5 percent aqueous sodium bicarbonate solution and three times extracted with chloroform. The combined extracts are dried with sodium sulfate, filtered and evaporated to dryness. From methanol/little water 348 mg of convallatoxin-acetonide, m.p. 158°–160°C, crystallize at 0°C, after seeding if necessary, which prove to be homogeneous in TLC.

The mother liquor residue is chromatographed on 160 g of neutral aluminum oxide Woelm (activity grade II). In order to separate apolar material, the column is first pre-eluted with 600 ml of chloroform and then with 300 ml of chloroform/methanol 99:1 (v/v). On elution with chloroform/methanol 98:2, 770 mg of a TLC-homogeneous fraction are obtained from which 246 mg of pure convallatoxin-acetonide, m.p. 160°C, can be obtained by crystallization (methanol/water).

IR-spectrum (KBr): $\lambda_{max}(\mu)$ inter alia 2.88, 3.40, 3.63, 5.66 (sh), 5.80, 5.88(sh), 6.20, 7.27, 9.34, 9.64

UV-spectrum: $\lambda_{max}$(nm) 212 ($\epsilon$14500; EtOH)

NMR-spectrum: (CDCl$_3$, $\delta$ in ppm) 0.89(s,3H), 1.29(d,3H,6Hz), 1.38(s,3H), 1.54(s,3H), 4.93(m,2H), 5.14(s,1H), 5.93(m,1H), 10.10(s,1H)

Total yield of crystalline convallatoxin-acetonide: 594 mg (0.12 percent). This yield corresponds to a 0.11 percent minimum content of convallatoxin.

EXAMPLE 2

320 g of flowers of the lily of the valley, same origin as in Example 1, contaminated by flowerstem impurities, which had been powdered in a mixer, are macerated, while stirring, with 4 l of 50 percent aqueous methanol for 72 hours at room temperature. Subsequently, the mixture is filtered by suction and the residue is washed with 1 lt. of aqueous methanol. The dark-brown drug extract is concentrated to 0.8 l on the rotary evaporator in vacuo at a bath temperature of 35°–40°C, and then continuously extracted with a chloroform/ethanol mixture, 93:7 (v/v), in an extractor 35°/110 torr for 48 hrs. The extract is concentrated to a volume of approx. 5 ml and mixed with 50 ml of petroleum ether. Following 2 hours of standing at 5°C the supernatant solution is poured off. The residue is evaporated to dryness and suspended in 60 ml of acetone. 20 ml of 2,2-dimethoxypropane and 150 mg of p-toluenesulfonicacid-monohydrate are added and this solution is allowed to stand for 10 minutes at room temperature with occasional shaking. The solution is now neutralized with 5 percent aqueous sodium bicarbonate solution and three times extracted with chloroform. The combined and dried, slightly turbid chloroform extracts are evaporated to dryness in vacuo, the residue is separated into an acetonide fraction, a less polar and a more polar fraction by pseudochromatography on 80 g of neutral aluminum oxide Woelm (activity grade II), using chloroform and chloroform/methanol 98:2 as eluents. By crystallization of the acetonide fraction from methanol/small amount of water at 0°, 365 mg (0.114 percent) of pure convallatoxin-acetonide, m.p. 159°–160°, are obtained. This yield corresponds to a minimum convallatoxin content of 0.105 percent of the drug used.

EXAMPLE 3

Convallatoxin from Convallatoxin-Acetonide 250 mg of convallatoxin-acetonide, obtained according to Examples 1 or 2, are dissolved in 20 ml of alcohol and, following addition of 10 ml of 1 percent aqueous sulfuric acid, heated under nitrogen to 55°C for 2 hrs. After neutralization with 5 percent aqueous sodium bicarbonate solution the mixture is three times extracted with chloroform/ethanol 8:2. By drying and evaporation of the combined extracts in vacuo, 273 mg of colorless foam are obtained. By crystallization from methanol/water, 203 mg (88 percent of theory) of pure convallatoxin is obtained in two crops, which proved to be identical with authentic material in every respect.

What is claimed is:

1. A process for the isolation of convallatoxin acetonide from a crude extract of convallaria which consists essentially of
   A. concentrating the crude extract;
   B. reacting, in the presence of p-toluene-sulfonic acid-monohydrate catalyst, the convallatoxin present in the concentrated extract with acetone to form said convallatoxin acetonide, and
   C. separating the acetonide by crystallization and subsequent filtration from the rest of the extract mixture.

2. A process as set forth in claim 1 wherein the crude extract of convalleria is obtained by macerating convallaria flowers, extracting them with 50 percent aqueous methanol, concentrating the extract in a vacuum, extracting the concentrate with a chloroform-ethanol solvent and evaporating the extract solution to dryness.

3. A process for the isolation of convallatoxin acetonide from a crude extract of convallaria which consists essentially of
   A. concentrating the crude extract;
   B. reacting, in the presence of a p-toluene-sulfonic acidmonohydrate catalyst, the convallatoxin present in the concentrated extract with acetone to form said convallatoxin acetonide, and
   C. separating the acetonide so formed by chromatography of the extract mixture.

4. A process as set forth in claim 1 wherein the convallatoxin so obtained is further subjected to a mild acid hydrolysis with about a 0.1 to 1.0 percent aqueous sulfuric acid.

5. A process as set forth in claim 4 wherein the hydrolysis of the convallatoxin acetonide is effected in a water-miscible solvent by treating it with an aqueous mineral acid.

* * * * *